United States Patent [19]

Kim

[11] Patent Number: 5,780,979

[45] Date of Patent: Jul. 14, 1998

[54] TRANSMISSION CONTROL SYSTEM FOR AN ELECTRIC VEHICLE

[75] Inventor: Chun-ho Kim, Kwangmyung-shi, Rep. of Korea

[73] Assignee: KIA Motors Corporation, Seoul, Rep. of Korea

[21] Appl. No.: 768,087

[22] Filed: Dec. 16, 1996

[30] Foreign Application Priority Data

Sep. 17, 1996 [KR] Rep. of Korea ............ 96-40375

[51] Int. Cl.⁶ .................................................. B60K 41/06
[52] U.S. Cl. ............... 318/15; 74/336 R; 74/473 R; 180/65.7; 180/338; 475/298
[58] Field of Search .............................. 318/9, 15, 466, 318/467; 74/325, 335, 336 R, 469, 470, 471 R, 473 R; 180/65.1, 65.6, 65.7, 65.8, 337, 338; 475/2, 5, 169, 172, 257, 298

[56] References Cited

U.S. PATENT DOCUMENTS 3,626,455  12/1971  Toda et al. .

4,912,997  4/1990  Malcolm et al. .

*Primary Examiner*—Bentsu Ro

[57] ABSTRACT

Disclosed is a transmission control system for an electric vehicle, comprising: a motor; a transmission connected to the motor; a shift fork rod connected to the transmission; a shift lever for speed shifting having a lower end; a shift rod having an end secured to the shift fork and the other end having a hollow hole which has an elastic member; a linkage having an end supported by the elastic memeber and the other end hinged to a lower end of the shift lever; a shift lever sensor for detecting movement of the shift lever; a motor speed sensor for detecting motor speed; a wheel speed sensor for detecting wheel speed; a shift fork sensor for detecting movement of the shift fork; an inverter for controlling the motor; and a control unit for controlling the inverter in accordance with signals of the motor speed sensor, the wheel speed sensor and the shift lever sensor.

2 Claims, 3 Drawing Sheets

5,780,979

TRANSMISSION CONTROL SYSTEM FOR AN ELECTRIC VEHICLE

FIELD OF THE INVENTION

The present invention relates to a transmission control system for an electric vehicle and more particularly to a transmission control system for an electric vehicle which does not have any clutch and also to a transmission control system for an electric vehicle which can be shifted smoothly.

DESCRIPTION OF RELATED ART

Generally, electric vehicles were in practical use even before gasoline vehicles were invented. However, as the gasoline vehicle was developed in its accelerating ability, mounting ability, driving ability and high speed, the electric vehicle gradually disappeared.

However, in recent years, the electric vehicle has been watched as one which is good for the environmental. Therefore, many parts of the electric vehicle, for example, an electric motor, a controller, and a drive system, have been examined and developed.

The electric vehicle must be designed differently from the internal combustion engine vehicle, because the characteristics of the motor is different from that of the internal combustion engine. Specially, the power train including transmission must be designed in different ways from each other because the torque characteristic of the motor is different from that of the internal combustion engine.

But, the conventional electric vehicle usually adopts the transmission used in the internal combustion engine vehicle.

The conventional power train for an electric vehicle includes a motor, a flywheel and a clutch connected to the motor, a transmission, a final reduction gear, and a differential gear. As for transmissions, the synchromesh type transmission is widely used in a conventional electric vehicle.

This type of transmission has an input shaft or clutch shaft having integral main drive gears and rotating with a clutch-driven plate (disc) and an output shaft having countergears and a synchronizer assembly. The synchronizer assembly consists of a hub, a sleeve and so forth. A shift fork is positioned in grooves in synchronizer sleeves and is connected to a shift lever by a linkage as a cable or a rod.

When the shift lever is applied, the movement of the shift lever is transferred to the shift fork by the linkage, and then the shift fork controls sleeve position.

That is, in conventional electric vehicles, shifting is accomplished while the clutch is being disengaged and the speeds of mating parts are being synchronized with each other.

Therefore, this type of transmission needs a clutch, which causes a complex structure and high cost to manufacture.

Also, since this type of transmission needs synchronization of mating parts, the movement of the shift lever is resisted until the synchronization of the mating parts, resulting in uncomfotable handling of the shift lever.

SUMMARY OF THE INVENTION

The present invention has been made in an effort to solve the above described problems of the conventional transmission system for an electric vehicle.

It is an object of the present invention to provide a transmission control system for an electric vehicle which does not have a clutch.

It is another object of the present invention to provide a shifting mechanism for an electric vehicle transmission which enables a shift lever to be moved smoothly.

The present invention focuses on the characteristic of the motor for an electric vehicle in comparison with the gasoline engine. That is, in an electric vehicle it is easy to control motor speed or motor torque, thus structure of the transmission can be simpler than that of the transmission used in internal combustion engine vehicle.

To achieve the above objects, the present invention provides a transmission control system for an electric vehicle, comprising: a motor for converting electric energy to usable mechanical energy directly; a transmission connected to the motor without clutch; a shift rod connected to the transmission, having a cylindrical hall; a linkage having one connected to the cylindrical hall of the shift rod through an elastic member, and the other end hingedly connected to a shift lever; a shift lever sensor for detecting the shift lever movement; a motor speed sensor for detecting motor speed; a wheel speed sensor for detecting wheel speed; a shift fork sensor for detecting shift fork movement; an inverter for controlling the motor; and a control unit for controlling the inverter in accordance with the motor speed sensor signal and the wheel speed sensor signal.

BRIEF DESCRIPTION OF THE DRAWINGS

The foregoing and other objects of the present invention will become more apparent from the detailed description below when taken in conjunction with the following drawings in which.

DETAILED DESCRIPTION OF THE PREFERRED EMBODIMENT

Preferred embodiment of the present invention will now be described in detail with reference to the accompanying drawings.

Figure 1:
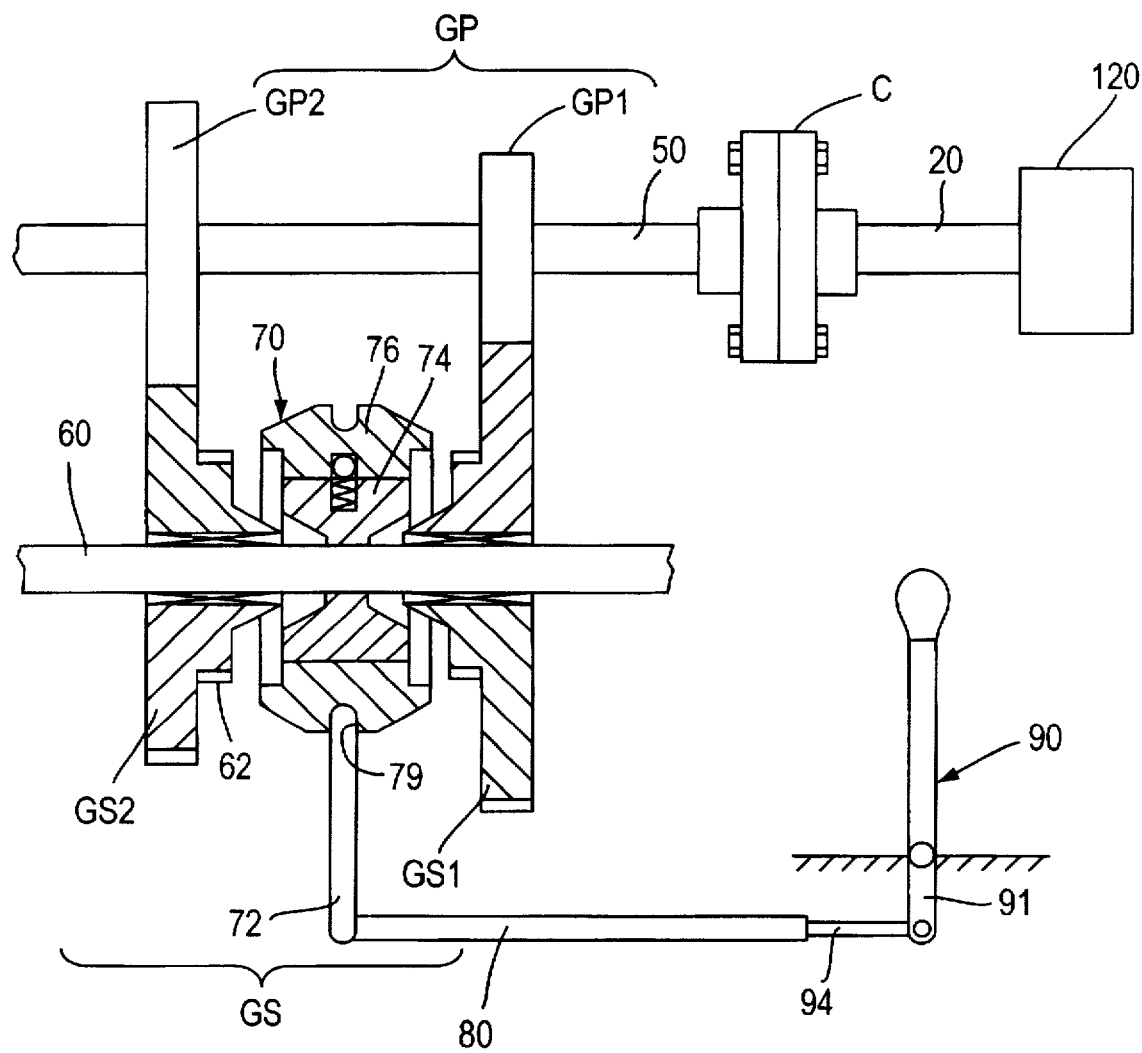
FIG. 1 is a schematic representation illustrating powerline including transmission for an electric vehicle in accordance with a preferred embodiment of the present invention.

Referring first to FIG. 1, in the powertrain for an electric vehicle, an input shaft 50 is directly connected to a motor shaft 20 through a coupling C without any flywheels or any clutches. The input shaft 50 has main drive gears GP and the output shaft 60 has countergears GS and a synchronizer assembly 70. The main drive gears GP have a first speed gear GP1 and a second speed gear GP2. The countergears GS have a first speed countergear GS1 and a second speed countergear GS2.

The input shaft 50 rotates all the time the motor 120 is rotating, and also the main drive gears GP1 and GP2 rotate. In addition, since the countergear GS1 and GS2 are in a constant mesh with the main drive gears GP1 and GP2, they also rotate at the time the motor 120 is rotating.

The countergear GS1 and GS2 rotate independent of the output shaft 60 and are in constant mesh with the main drive gears GP1 and GP2, respectively.

The synchronizer assembly 70 is connected to a shift lever 90 by a shift fork 72, a shift rod 80 and a linkage 94. The synchronizer assembly 70 consists of a hub 74, a sleeve 76 and so forth. The synchronizer hub 74 is splined to the output shaft 60. The sleeve 76 is splined to the hub 74 but can slide fore and aft on the hub 74. The shift fork 72 is positioned in a groove 79 in the sleeve 76 and controls sleeve position. This assembly permits a smooth gear engagement without clashing by synchronizing the speeds of mating parts before they engage with each other.

Figure 2:
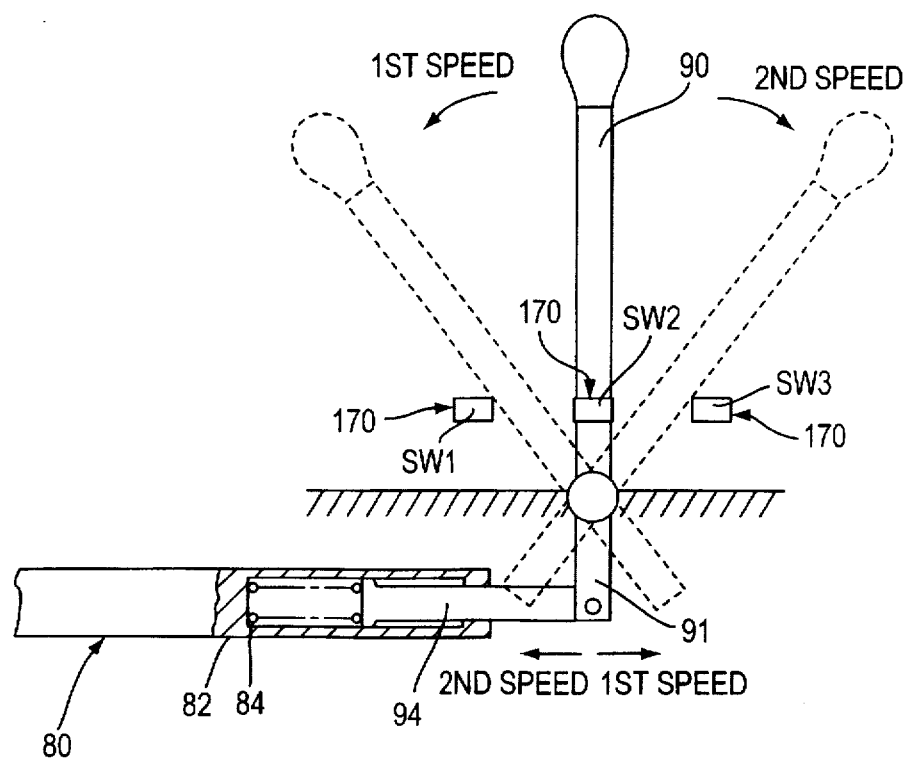
FIG. 2 is a detail view illustrating linkage of shifting mechanism for transmission control system in accordance with the preferred embodiment of the present invention.

Now referring to FIG. 2, the shift rod 80 has a hollow-cylinderical end 82, where a spring 84 is mounted. The spring 84 elastically supports a linkage 94 which is also hingedly connected to a lower end 91 of the shift lever 90.

Shift lever sensors or switches 170 (including SW1, SW2, and SW3) are mounted on a predetermined position where shift lever 90 passes and stops for accomplishing shifting.

Figure 3:
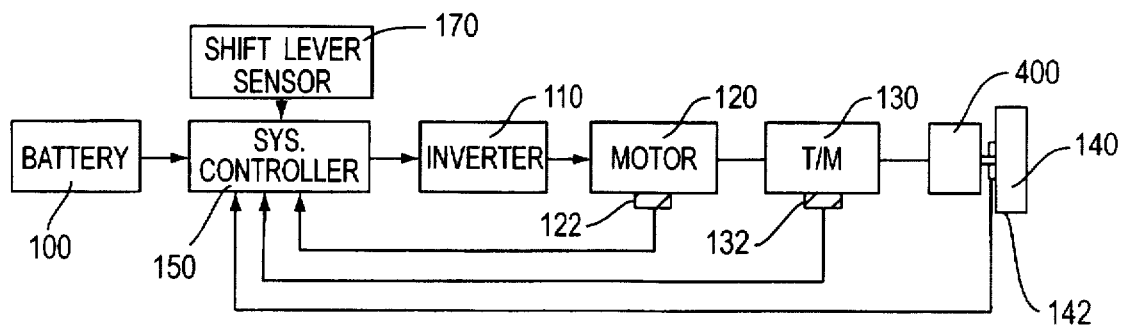
FIG. 3 is a schematic block diagram illustrating transmission control system for an electric vehicle in accordance with the preferred embodiment of the present invention.

Now referring to FIG. 3, the inventive transmission control system for an electric vehicle includes a motor 120 for converting electric energy to usable mechanical energy directly; a transmission 130 connected to the motor 120 without clutch; a shift lever sensor 170 for detecting the shift lever movement; a motor speed sensor 122 for detecting motor speed; a wheel speed sensor 142 for detecting wheel speed; a shift fork sensor 132 for detecting shift fork movement; an inverter 110 for controlling the motor 120; and a control unit 150 for controlling the inverter 110 in accordance with the motor speed sensor signal, the wheel speed sensor signal and the shift lever sensor signal. Reference number 100 in FIG. 3 indicates a battery for an electric vehicle.

When the shift lever 90 is moved to the 2nd speed range, the movement of the shift lever 90 is carried through the linkage 94 to the spring 84, and then the spring 84 is compressed and the elastic energy is reserved in the spring 84.

At this point, the shift lever movement is detected by the shift lever sensor 170, and then the shift lever sensor signal is provided to the control unit 150. The control unit 150 determines the output shaft speed and the countergear speed in accordance with the wheel speed sensor signal and the motor speed sensor signal, and then the control unit 150 controls the inverter 110 such that the output shaft speed is the same as the countergear speed.

When the synchronization of speed of the mating parts is accomplished, the synchronizer assembly 80 can move smoothly to the teeth 62 of the determined counter gear GS2 and the elastic energy of the spring 84 pushes the shift rod 80 for full engagement of the synchronizer teeth 62 on the countergear GS2 and synchronizer assembly 70. This prevents clashing of gears during gear shifting. Also when the shift lever 90 is moved to the 1st speed range, the spring 84 is extended for a while in order for synchronization of the output shaft 60 and input shaft 50.

That is, when the movement of the shift lever 90 to the 1st speed range is reconized by the sensor 170, the motor 120 is controlled to rotate in the same speed with the output shaft 60, which can be determined by wheel speed.

Figure 4:
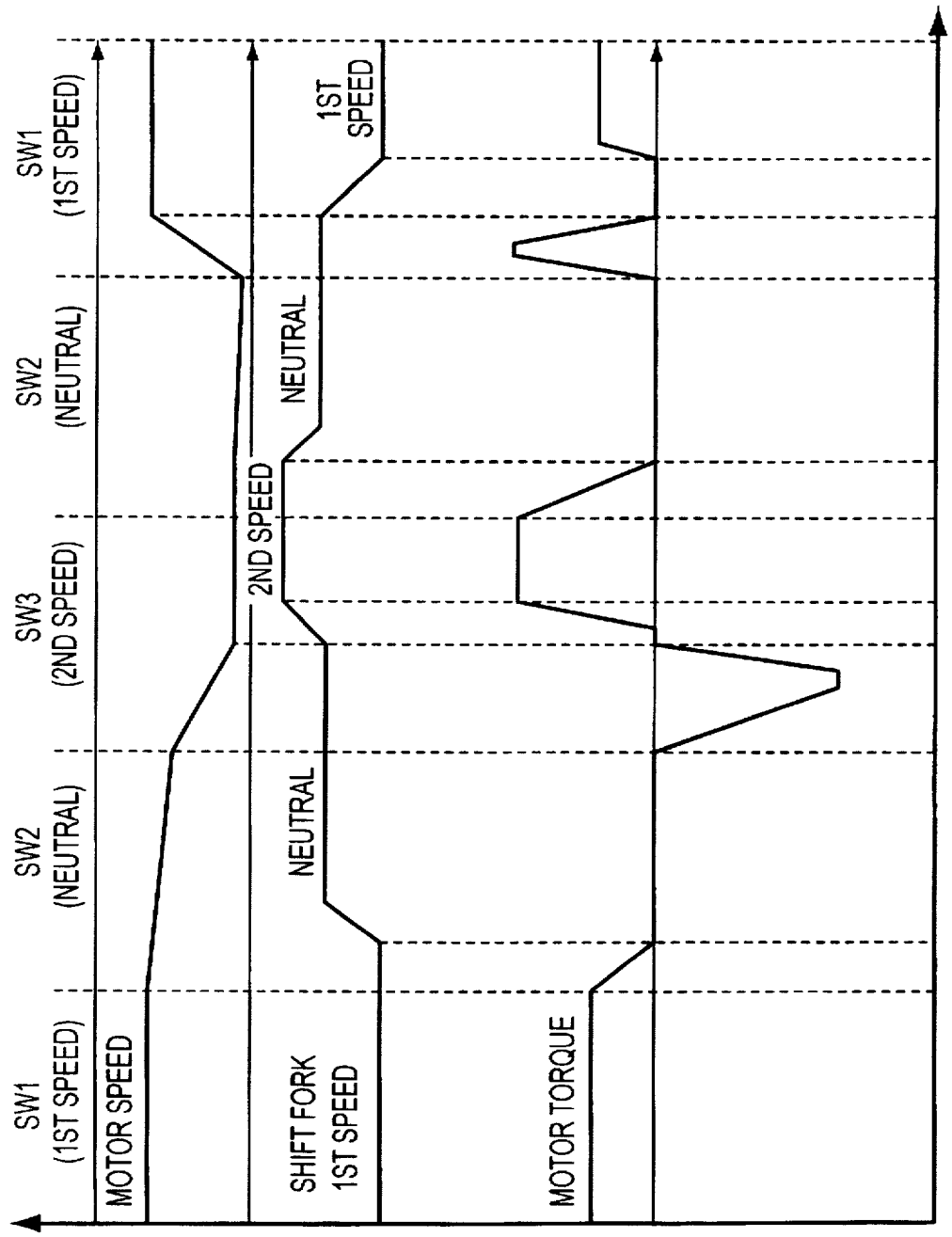
FIG. 4 is a graph showing change of motor speed and motor torque when gear shifting.

FIG. 4 is a graph showing the change of motor speed and motor torque when gear shifting. As can be imagined from FIG. 4, the shift lever sensor 170 detects the movement of the shift lever 90, before the shift fork 72 is fully moved to its desired position due to the spring 84.

For example, when transmission from 1st speed to 2nd speed, the movement of the shift lever is detected and motor torque is controlled to be rapidly decreased to zero and the motor speed slightly decreases due to inertia. When the shift lever is moved from neutral to 2nd speed, the motor torque is controlled to be negative with a steep slope to get the motor speed down enough to synchronization of the speed of the mating parts. After that the motor torque is controlled to increase rapidly in order to fullfill the second speed.

The other shift or from 2nd speed to 1st speed will exprience similar process, the detailed description is not necessary in this specificatiion.

As described above, since the transmission control system according to the present invention can be shifted without clutch, the gear shifting is simple and comfortable.

Also, since the transmission control system according to the present invention enables gear shifting smoothly due to the spring, the gear shifting is smooth and comfortable to shift.

Although preferred embodiment of the present invention has been described in detail hereinabove, it should be clearly understood that many variations and/or modifications of the basic inventive concepts herein taught which may appear to those skilled in the present art will fall within the spirit and scope of the present invention, as defined in the appended claims.

What is claimed is:

1. A transmission control system for an electric vehicle, comprising:

a motor;

a transmission connected to said motor;

a shift fork rod connected to said transmission;

a shift lever for speed shifting having a lower end;

a shift rod having an end secured to said shift fork and the other end having a hollow hole which has an elastic member;

a linkage having an end supported by the elastic memeber and the other end hinged to the lower end of said shift lever;

a shift lever sensor for detecting movement of said shift lever;

a motor speed sensor for detecting motor speed;

a wheel speed sensor for detecting wheel speed;

a shift fork sensor for detecting movement of said shift fork;

an inverter for controlling said motor; and a control unit for controlling said inverter in accordance with signals of said motor speed sensor, said wheel speed sensor and said shift lever sensor.

2. A transmission control system for an electric vehicle according to claim 1, wherein said elastic member is a spring.

\* \* \* \* \*